March 1, 1960    J. W. STECK    2,926,383
POULTRY NECK REMOVER

Filed Oct. 31, 1957    2 Sheets-Sheet 1

INVENTOR
JEROME W. STECK
BY *Joseph G. Werner*
ATTORNEY

March 1, 1960        J. W. STECK        2,926,383

POULTRY NECK REMOVER

Filed Oct. 31, 1957        2 Sheets-Sheet 2

INVENTOR
JEROME W. STECK
BY *Joseph G. Werner*
ATTORNEY

United States Patent Office 2,926,383
Patented Mar. 1, 1960

2,926,383
POULTRY NECK REMOVER
Jerome W. Steck, Whitewater, Wis.
Application October 31, 1957, Serial No. 693,694
8 Claims. (Cl. 17—11)

This invention relates to apparatus for removing the neck of poultry and particularly the neck of poultry from which the head has previously been removed, for use in establishments where poultry is dressed and processed for sale.

Various devices have been used for killing and removing the heads of poultry. Generally, such devices have been dependent upon the greater size of the head as compared to the size of the neck, thus permitting the head of the poultry to be pulled from the body as is illustrated in Pat. No. 2,632,200 to Fortner et al. In other devices, the increased size of the head over the neck has provided a means for carrying the fowl in a conveyor system, as is demonstrated in Pat. No. 2,793,393 to Fosdick.

In the modern merchandising of poultry it is the common practice to first remove the head of the chicken by any of various methods, and then permit blood to drain from the body for a short time. Thereafter, the neck of the poultry is removed from the chicken and it is wrapped and sold with the body. Thus, the removal of the neck permits a more compact and better looking package for poultry in the market, and constitutes a convenience for the housewife or other person who prepares the fowl for the table. The head of the chicken, on the other hand, is sold as salvage separately from the neck and body of the poultry, and, accordingly, must be severed from the neck.

Mechanical apparatus heretofore used for the removal of the head of fowl will not work successfully for the severance of the neck from the body where the head has already been removed. With the head removed there is no enlargement at the unattached extremity of the neck for holding that end of the neck in the manner described by Fortner et al. and Fosdick. Rather, it has been the practice to remove the neck by hand labor with pruning scissors or knife. Such hand labor has necessarily produced a lack of uniformity as to the location at which the neck is severed from the body, and in some instances the cuts are jagged and uneven.

It is an object of the present invention to provide apparatus for removal of the neck of poultry from the body thereof which will render savings by eliminating the hand labor previously required for such purpose.

Another object of the invention is to provide apparatus for removal of the neck of poultry which will sever the neck from the body at a location at the base of the neck which is uniform with respect to the various birds being processed.

An additional object of the invention is to provide apparatus for removal of the neck of poultry which will sever the neck of the poultry from the body evenly and with appropriate guides to prevent cutting or severance of the wings or other parts of the body.

A further object of the invention is to provide apparatus for removal of the neck of poultry which permits the fowl to bleed in an upside down position after removal of the head before the neck is severed from the body.

Still another object of the invention is to provide apparatus for the removal of the neck of poultry which is relatively inexpensive, and which may be added to the conventional equipment now found in poultry processing plants.

Other objects and advantages of the invention will be apparent from the following detailed description taken in conjunction with the accompanying drawings wherein a preferred embodiment of the principles of the invention has been selected for exemplification.

Figure 1:
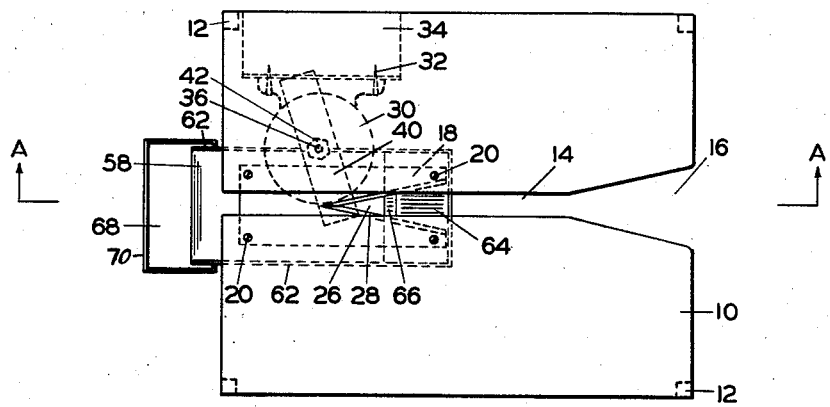
Fig. 1 is a top plan view of an embodiment of the present invention.

Referring more particularly to the drawings wherein like numerals refer to like parts, table 10 having a substantially smooth top surface and having legs 12 or other supports has slot 14 which may extend the full length of the table, said table providing support means at the opposite sides of the slot, and which slot preferably has a widened area or entrance end 16 at one end of table 10. A plate 18, preferably of steel, is fastened to the underside of the table 10 by bolts 20 and nuts 22 with intervening lock washer 24, or by screw bolts 20a threaded through table 10 and plate 18 without washer or nut, by spot welding, or by other appropriate means. In the preferred embodiment the plate 18 is near the end of table 10 opposite from the widened area 16 of slot 14 and extends under slot 14. The plate 18 has a V-shaped notch 26 at one end. The sides of V-shaped notch 26 are preferably bevelled so as to form sharp blades 28. Plate 18 preferably is positioned so that the vertex of the V of notch 26 is situated under the longitudinal center of slot 14, with the open side of the V extending toward the widened area 16 of slot 14.

Figure 5:
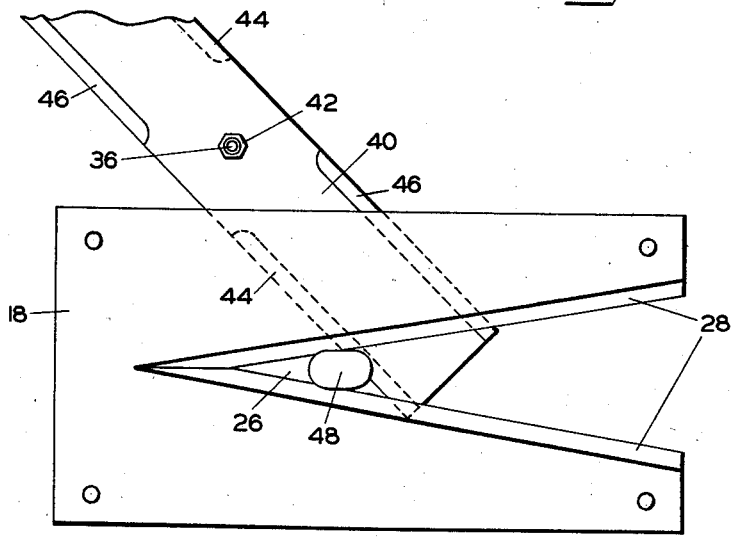
Fig. 5 is an enlarged top plan view of the table blades and a portion of the motor blade.

Positioned below the top of table 10 and below a portion of plate 18 is a motor 30 having its drive shaft 36 extending upward in vertical position. Motor 30 may be secured by screws 32 or other means to a block 34 secured to the table 10 by any appropriate means. Motor shaft 36 carries a blade mounting plate 38 to which is secured by welding or other suitable means motor blade 40. Blade mounting plate 38 and motor blade 40 are secured to motor shaft 36 by nut 42 or other suitable means. Motor blade 40 is preferably made of high grade steel or similar material with two or more blades having bevelled edges 44 and 46. The blade 40 may be bevelled in one direction on one edge and in the opposite direction on the other edge, thereby permitting the blade to be turned over for use with a sharp edge when the previously used edge becomes dull. The motor is preferably located in a position that the motor shaft is to one side of the slot 14 as best illustrated in Figs. 1 and 5. The motor blade 40 is positioned under plate 18 so as to just clear plate 18 as the motor blade revolves. Moreover, the motor blade 40 is of such length as to pass beneath the portion of the V-shaped notch 26 so as to sever the neck 48 of the poultry as best shown in Fig. 5.

Preferably the forward sharp edge 44 of motor blade 40 should be adjacent to the sharp edges of blades 28 as the motor blade 40 passes just below the blades 28 when the motor blade revolves.

A conventional conveyor track 50 and carrier 52 with hooks 54 which carry the poultry 56 in neck-down position is placed at the desired height in a course approximately parallel to the longitudinal center of slot 14. Conventional guide means for hooks 54 are used so that the poultry 56 will be carried toward the table with its back first, the back of the neck being first to enter slot 14. The carrier 52 and hooks 54 are moved on the track by another motor (not shown).

Carried below plate 18 is endless belt 58 over rollers 60, which likewise is motivated by a motor.

Figure 2:
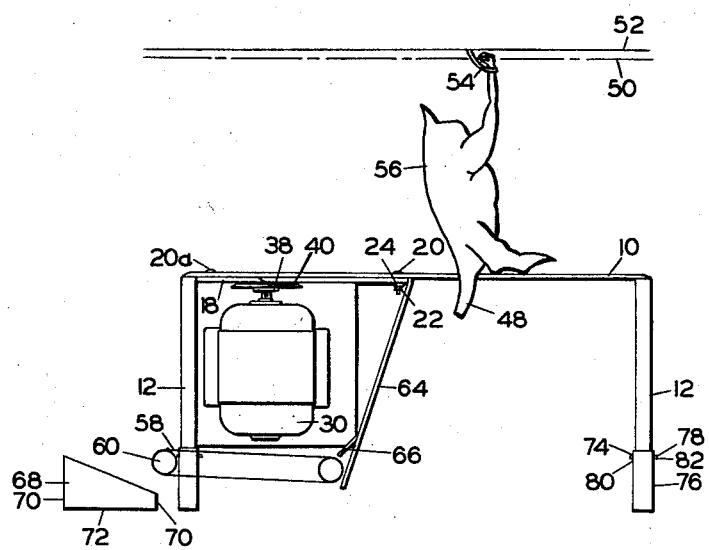
Fig. 2 is a side elevational view taken on the line A—A of Fig. 1, and showing a portion of the conveyor system.
Figure 3:
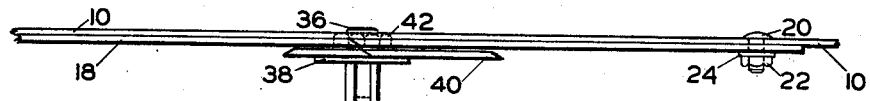
Fig. 3 is an enlarged side elevational view of a portion of the motor, motor blade and table blade with detailed construction and methods of attachment, as shown in Fig. 2.
Figure 3:
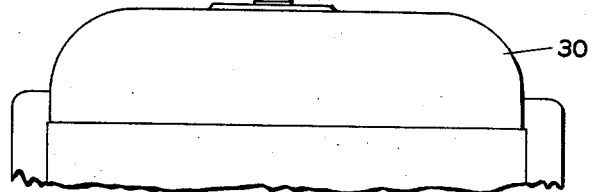
Figure 4:
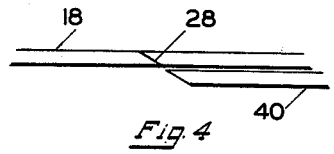
Fig. 4 is an enlarged side elevational view showing the preferred bevel of the motor and table blades as shown in Fig. 3.

One section of the endless belt 58 may extend beyond the edge of table 10 as shown in Fig. 1. The endless belt 58 may be made of neoprene or other suitable material. Side walls 62 and end wall 64 extend downward from the underside of the top of table 10 to enclose endless belt 58 on three sides. Guide 66 extends from end wall 64 to become in close proximity with the top of endless belt 58 as best shown in Fig. 2.

Figure 6:
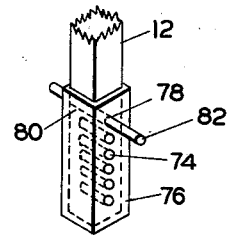
Fig. 6 is an enlarged perspective view of the table legs and sleeves.

To enable height adjustment of the table 10 for different sized fowl, the lower portion of each of legs 12 has several apertures 74 in a vertical line which apertures extend horizontally through the leg, over which a sleeve 76 is fitted, as shown in Fig. 6. The sleeve 76 has an aperture 78 near one end with a similar aperture 80 directly opposite on a horizontal plane with the opposed aperture. Removable pins 82 extend through one aperture 78 of the sleeve, then through one of the apertures 74 in the legs through the opposite aperture 80 in the sleeve.

In operation, the poultry is placed in the conveyer system with the head downward and by well-known conventional procedures the head and feathers are removed before it reaches the present invention. It is obvious the head may also be removed by the present invention to be followed by a second operation of cutting off the neck as herein described. A substantial amount of the blood is drained from the body as the poultry is carried in neck down position by the conveyer system to the table 10. As the poultry approaches table 10, the neck enters the large area 16 of slot 14 as stated, conventional guide means on hooks 54 position the poultry so that the back of the neck first enters slot 14, thus preventing the wings from entering the slot as the poultry approaches knife blade 40. As the poultry is carried toward blade 40, the wings are carried on the top of table 10 while the neck extends downward through slot 14.

The motor turns motor knife 40 as such speed as the operator may desire, though it has been found that a speed of about 1750 revolutions per minute is satisfactory. As the poultry approaches the vertex of the V-shaped notch 26 the neck 48 is held in position between blades 28 as the motor blade severs the neck from the body, as illustrated in Fig. 5.

As the neck falls it is guided by guide 66 onto the turning endless belt which conveys the necks to a hopper 68, having sides 70 and bottom 72, where the necks may be collected.

As shown, the motor blade 40 and plate 18 may be easily removed for sharpening of the blades. Moreover, motor blade 40 may be removed, turned over and replaced on motor shaft 36, so that cutting edges 46 may be used.

Provision may be made for raising or lowering table 10 to accommodate poultry of different sizes. The table may be raised or lowered by placing pins 82 through holes 78 in sleeve 76, and through the appropriate aperture 74 in legs 12 which will give the desired height for table, and then through the opposite aperture 80 in the sleeve. This illustrates merely one way of adjusting the height of the table. It is obvious that other means for such adjustment may be readily provided, such as hydraulic or mechanical means.

It is to be understood that the present invention is not confined to the precise construction and arrangement of parts as herein illustrated and described, but embraces all such modified forms thereof as come within the scope of the following claims.

I claim:

1. In apparatus for removing the necks of poultry, the combination of a conveyor to support the poultry in a neck-down position and to move the poultry along a prescribed course, a table having a substantially smooth top surface and an elongated slot in said top surface, the said elongated slot having an entrance end and being of a width slightly larger than the diameter of the largest neck passing therethrough, said elongated slot being disposed beneath said conveyor so as to receive the suspended necks of the poultry for passage through said elongated slot, said table providing support means at opposed sides of said elongated slot for contact with the opposed wings of the poultry whereby to support the poultry above said elongated slot during passage through said elongated slot, and knife means below and closely adjacent said elongated slot for severing the necks of poultry passed by said conveyor through said elongated slot.

2. In apparatus for removing the necks of poultry, the combination of a conveyor to support the poultry in a neck-down position and to move the poultry along a prescribed course, a table having a substantially smooth top surface and an elongated slot in said top surface, the said elongated slot having an entrance end and being of a width slightly larger than the diameter of the largest neck passing therethrough, said elongated slot being disposed beneath said conveyor so as to receive the suspended necks of the poultry for passage through said elongated slot, said table providing support means at opposed sides of said elongated slot for contact with the opposed wings of the poultry whereby to support the poultry above said elongated slot during passage through said elongated slot, and knife means closely adjacent and substantially traversing said elongated slot for severing the necks of poultry passed by said conveyor through said elongated slot.

3. The apparatus of claim 2 wherein the elongated slot is substantially unobstructed.

4. The apparatus of claim 2 wherein the knife means includes a stationary blade.

5. The apparatus of claim 2 wherein the knife means includes a movable blade.

6. The apparatus of claim 2 additionally including means for receiving poultry necks severed by the knife means.

7. The apparatus of claim 2 additionally including means for receiving and conveying poultry necks severed by the knife means.

8. The apparatus of claim 7 wherein the poultry neck receiving and conveying means is disposed beneath the level of the elongated slot.

References Cited in the file of this patent

UNITED STATES PATENTS

| | | |
|---|---|---|
| 1,729,845 | Sawicki | Oct. 1, 1929 |
| 2,435,762 | Urschel | Feb. 10, 1948 |
| 2,632,200 | Fortner et al. | Mar. 24, 1953 |
| 2,787,807 | Anderson et al. | Apr. 9, 1957 |
| 2,828,506 | O'Donnell | Apr. 1, 1958 |